June 18, 1935.     J. C. DIEHL     2,005,024
GAS METER
Filed Feb. 24, 1933     2 Sheets-Sheet 1

John C. Diehl
INVENTOR.

BY
ATTORNEYS.

June 18, 1935. J. C. DIEHL 2,005,024
GAS METER
Filed Feb. 24, 1933 2 Sheets-Sheet 2

John C. Diehl
INVENTOR.
BY
ATTORNEYS.

Patented June 18, 1935

2,005,024

UNITED STATES PATENT OFFICE 2,005,024

GAS METER

John C. Diehl, Erie, Pa., assignor to American Meter Company, New York, N. Y., a corporation of Delaware Application February 24, 1933, Serial No. 658,287

10 Claims. (Cl. 73—1)

Gas meters heretofore have been made involving a case and a plurality of diaphragms operating in the case. Among such meters are meters which involve three measuring chambers some of which meters have been formed by providing three diaphragms arranged around the faces of the case and providing three measuring chambers. Meters have also been provided in which there are two diaphragms arranged in parallel relation providing measuring chambers at the outer sides of the diaphragms and between the diaphragms. The latter form of meter is cheaper than the three-diaphragm meter, but involves certain disadvantages and complications in construction particularly in view of the fact that it does not readily communicate its movement to the operating, or control shaft. If a single throw crank is used on a centrally located shaft there is chance for the meter stopping on dead center. In consequence the common practice is to provide the shaft with a plurality of cranks off-set. This avoids the accidental stoppage of the meter, but introduces complications in that in regulating, or adjusting the meter the double crank construction does not lend itself to such adjustment and in consequence, as a compromise, such meters have been adjusted by adjusting a single one of the diaphragm connections, thus changing the throw of one diaphragm relatively to the other and the capacity of the chambers. This places a greater wear upon one diaphragm than the other and does not give as desirable a metering action as where the diaphragms have a uniform throw.

The present invention is designed to improve the three-chamber two-diaphragm meter and broadly speaking it is accomplished by arranging these two diaphragms in planes at an angle to each other, preferably an included angle of 60°. With this structure the diaphragms operate with links centrally positioned with relation to the diaphragms and extending in the general direction of movement of the diaphragm to a crank arranged in the larger part of the middle chamber, this crank being, by reason of the inclination of the links and their central attachment to the diaphragms off-set from the center of the case.

Such a structure provides very definite advantages over the meters heretofore made. It provides three chambers with but two diaphragms, these diaphragms operating upon a single throw crank in such angular relation as to prevent dead center. The single crank by its single adjustment equally adjusts the throw and timing of both diaphragms. The arrangement of the diaphragms at an angle and the placing of the crank off-set from the center permits of the use of a smaller case with the same size diaphragms and with links of sufficient length to communicate the movement more satisfactorily to the cranks than is practical with the diaphragm arranged in parallel relation. Consequently it is possible to make a meter of equal capacity with a smaller case. The enlarged space also in the larger end of the middle chamber between the diaphragms affords a convenient position for placing the registering mechanism, so that the movement may be readily taken off the crank or crank-operated shaft and conveniently positioned. Features and details of the invention will appear from the specification and claims.

A preferred embodiment of the invention is illustrated in the accompanying drawings as follows:—

Fig. 1 shows a front elevation of the meter.

Fig. 2 a vertical section through the meter on the lines 2—2 in Figs. 3 and 4.

Figure 1:
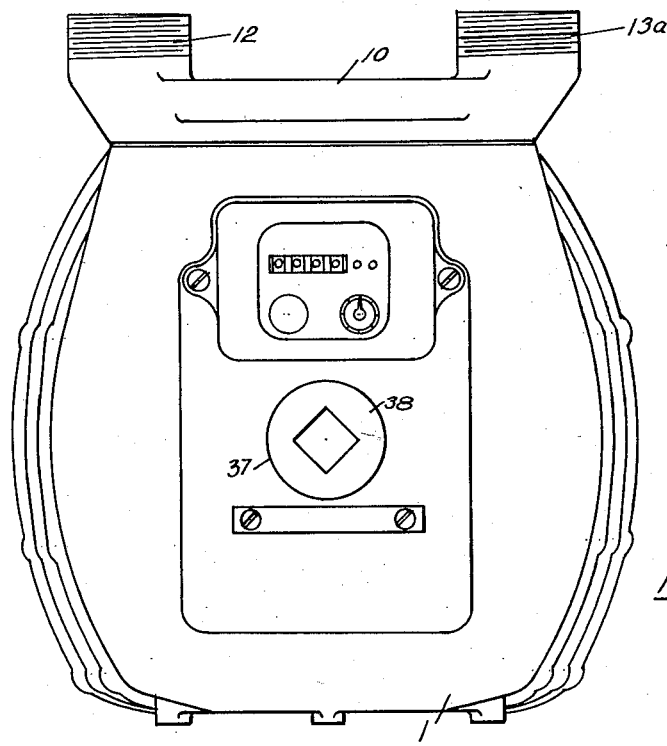
Figure 2:
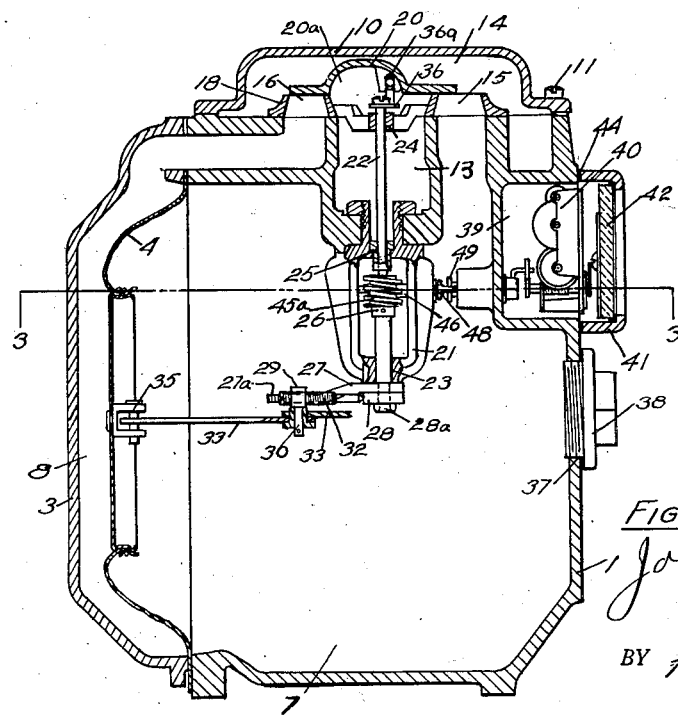
Figure 3:
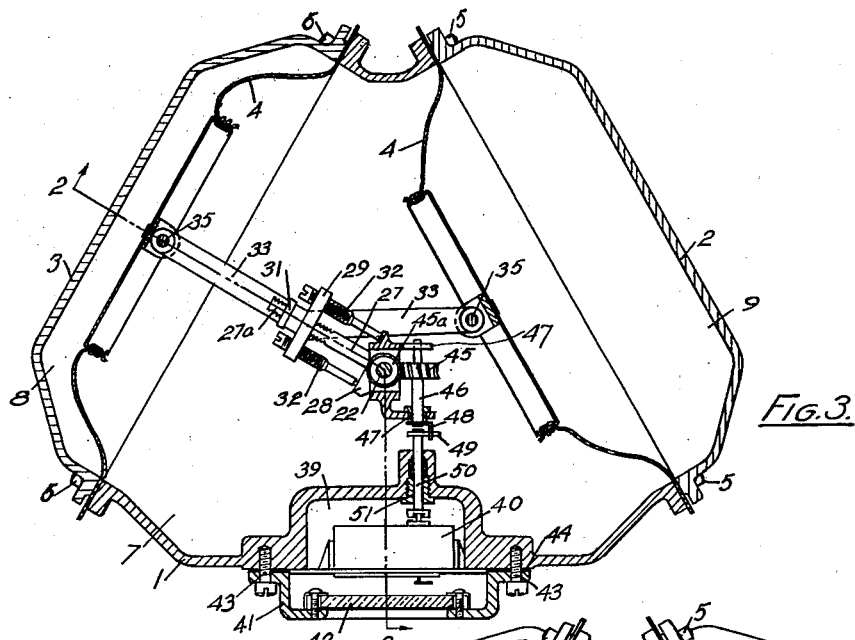
Fig. 3 shows a section on the line 3—3 in Fig. 2.
Figure 4:
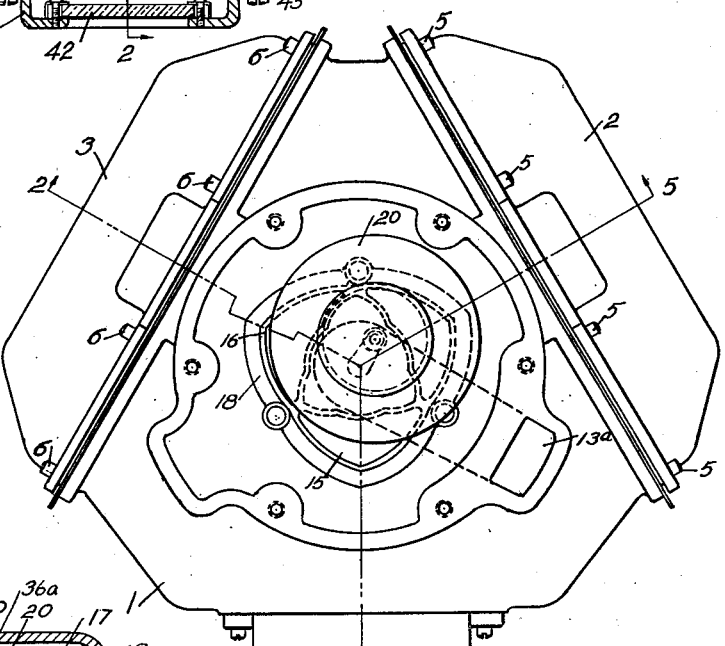
Fig. 4 shows a plan view of the valve chamber, the cover of the valve chamber being removed.
Figure 5:
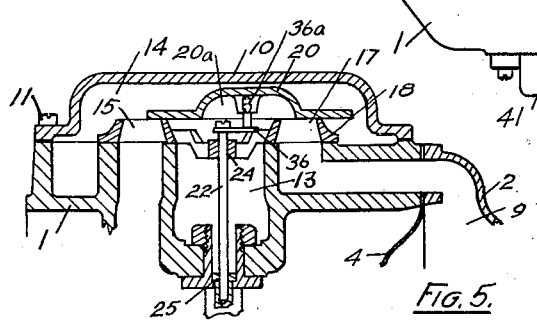

Fig. 5 a section on the line 5—5 in Fig. 4.

The case is made up of a body portion 1 with side covers 2 and 3. Flexible diaphragms 4, 4 are clamped to the body of the case by the covers by means of screws 5 and 6. The edges of the diaphragms operate as gaskets for the joints between the covers and the body.

This arrangement provides three measuring chambers, a central measuring chamber 7 between the inner sides of the diaphragms, and the measuring chambers 8 and 9 at the outer sides of the diaphragms. A valve chamber 14 is formed on the top of the body by means of a recessed cover 10, the cover being secured to the body by screws 11. The inlet 12 leads directly to the chamber 14. The outlet port 13 is formed in the body and extends from the valve-controlled ports hereinafter described and discharges to a discharge passage 13a.

The body of the case has three ports 15, 16 and 17 leading from the valve chamber to the measuring chambers 7, 8 and 9 respectively, the ports being extended through a valve seat plate 18. These ports are controlled by a rotary valve 20 which operates over the ports 15, 16 and 17 connecting these ports with the chamber 14 for filling and connecting these ports with a discharge port, or passage 13 through an exhaust cavity 20a in the valve for discharging the measuring chambers. A control shaft 22 is mounted in a hanger fitting 21 secured in the upper wall of the body. This shaft is mounted in bearings 23 and 24 and passes through a stuffing box 25 sealing the central measuring chamber from the discharge. Preferably the shaft is made in two pieces connected by a coupling 26 below stuffing box 25.

The crank, usually referred to in this art as a "tangent" is mounted on the shaft 22. A crank arm 27 is provided with an eye on its inner end through which the shaft 22 extends, the arm 27 being rotatable on the shaft. The outer end of this arm is screw-threaded and provided with a flat 27a at one side. A cross head 29 is slidingly mounted on the arm 27, the flat locking it against turning on the arm. A fixed head 28 is locked on the end of the shaft 22 and secured by a nut 28a. Adjusting screws 32 extend through screw-threaded openings in the cross head 29 into sockets in the fixed head 28. A nut 31 is provided on the screw-threaded end of the arm 27. This forms a very simple tangent, or crank, which may be very nicely adjusted both as to throw and as to timing. Adjusting screws 32 are provided with slots and they may be, therefore, turned by a tool, such as an ordinary screw driver extending in alinement with the screws. The nut 31 operating on the screw-threaded end of the arm 27 may be actuated by a socket wrench, these tools all extending in the same general direction. By reason of this it is possible to provide the case with a comparatively small hole 37 in the case and in a location toward which the crank may be turned. This opening 37 is closed by a plug 38. To adjust the throw of the crank outwardly so as to increase the throw the nut 31 is loosened and screwed out to the point of desired adjustment. The screws 32 are then turned equally bringing the cross head 29 out into engagement with the nut 31. As the screws are tightened in this position the whole mechanism is locked in adjustment. To adjust the throw of the crank inwardly the screws 32 are unscrewed permitting the movement of the cross head inwardly to the desired point of adjustment. The nut 31 is then set up against the cross head at this adjusted position and thus the mechanism locked in this new adjustment. When it is desired to change the timing of the crank one screw 32 is loosened and the other screw tightened. This swings the arm 27 relatively to the shaft 22 and changes the timing. This adjustment is positive and is simply made by the use of a screw driver and set by merely setting up the screws. A crank pin 30 is fixed on the cross head 29 and links 33 extend from the pin to pivotal connections 35 mounted on the diaphragms. A crank 36 is fixed on the upper end of the shaft 22 and operates in an opening 36a in the under-side of the valve 20 and consequently actuates the valve in proper cycle with the movements of the diaphragms in the usual manner. The front of the body of the case is provided with a chamber 39, this chamber extending into the larger side of the chamber 7. A counter mechanism 40 is mounted in this chamber. The chamber is closed by a cover 41 secured by screws 43 and sealed by a gasket 44. The cover is provided with a window 42 through which the counter may be read. Thus the meter body with the several covers as described is made completely proof against dust and moisture, and at the same time forms a case of pleasing appearance and of a shape giving strength with comparatively thin walls.

A take-off mechanism for driving the counter is provided. A gear 45 is fixed on a shaft 46 mounted in bearings 47 on the hanger 21. Gear 45 meshes with worm 45a on shaft 22. The shaft 46 has a crank 48 which drives a crank 49 on a shaft 50 which shaft drives the counter. A stuffing box 51 seals the shaft opening to the counter chamber.

In the operation of the meter, gas enters the valve chamber, is admitted in proper rotation by the valve through the several ports to the measuring chamber, discharged by those ports and by way of the center of the valve to the exhaust port 13 and thus carried to the discharge. Preferably the diaphragms are inclined to include an angle of 60° as this gives a more uniform action on the crank. It also forms an enlarged part of the chamber which may be utilized for the cranks and for the registering mechanism making a convenient take-off from the control shaft to the registering mechanism. It also provides a wall space through which the adjustment of the tangent may be readily made. The inclination of the diaphragms also makes it possible to reduce the size of the case and still give ample length to the connecting links for smooth operation. This is brought about by the fact that the controlling shaft is off-set from the center, thus giving greater length to the links than as if those links were directly opposed as with the parallel construction.

What I claim as new is:—

1. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; and means actuated by said diaphragms controlling the filling and discharging of said chambers.

2. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; and means controlling the filling and discharging of said chambers, comprising a single-throw crank connected to said diaphragms.

3. In a meter, the combination of a case; diaphragms mounted in the case in planes inclined to each other including an angle of approximately 60° and forming measuring chambers responsive to the action of the diaphragms on the outer sides of the diaphragms and a chamber between the inner sides of the diaphragms extending from diaphragm to diaphragm; means controlling the filling and discharging of said chambers, comprising a single-throw crank connected to said diaphragms.

4. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; a valve mechanism controlling the filling and discharging of the chambers; a control shaft having a crank between the diaphragms; and links connecting the diaphragms with the crank.

5. In a meter, the combination of a case; diaphragms mounted in the case and forming measuring chambers responsive to the action of the diaphragms on the outer sides of the diaphragms and a chamber between the inner sides of the diaphragms extending from diaphragm to diaphragm; and means actuated by the diaphragms controlling the filling and discharge of said chambers comprising a single-throw crank located within the middle chamber and between the diaphragms.

6. In a meter, the combination of a case; diaphragms mounted in the case and forming measuring chambers responsive to the action of the diaphragms on the outer sides of the diaphragms and a chamber between the inner sides of the diaphragms extending from diaphragm to diaphragm; and means actuated by the diaphragms controlling the filling and discharge of said chambers comprising a single-throw crank off-set from the center of the case and located in the middle chamber and between the diaphragms.

7. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; and means controlling the filling and discharging of said chambers comprising a single-throw crank connected to said diaphragms, said crank being off-set from the center of the case.

8. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; and means actuated by the diaphragms controlling the filling and discharging of said chambers, comprising a crank shaft located approximately at the intersection of the axes of the diaphragms and off-set from the center of the case.

9. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; means actuated by the diaphragms controlling the filling and discharging of said chambers; a counter chamber arranged in the larger side of the measuring chamber arranged between the diaphragms; a counting mechanism in the counter chamber; and a take-off mechanism from the controlling means driving the counter.

10. In a meter, the combination of a case; diaphragms mounted in the case in planes inclined to each other and forming measuring chambers responsive to the action of the diaphragms on the outer sides of the diaphragms and a chamber between the inner sides of the diaphragms extending from diaphragm to diaphragm; means actuated by the diaphragms controlling the filling and discharging of said chambers; a counter chamber formed in the wall of the larger side of the measuring chamber between the diaphragms; a counting mechanism in the chamber; a windowed cover over the counting mechanism; and a take-off mechanism driving the counter from the control means.

JOHN C. DIEHL.